United States Patent [19]

Gallogly et al.

[11] 3,730,395
[45] May 1, 1973

[54] SEED AND FERTILIZER SPREADER

[76] Inventors: Donald R. Gallogly, Route 2, Box 232; William E. Wheeler, 610 3rd Avenue, both of Sweet Home, Oreg.

[22] Filed: July 21, 1971

[21] Appl. No.: 164,614

[52] U.S. Cl. ............... 222/145, 222/178, 222/193, 222/533, 239/655
[51] Int. Cl. ............................................. B67d 5/60
[58] Field of Search ............... 222/193, 176, 178, 222/145, 561, 533; 239/654, 656, ; 302/51, 57

[56] References Cited

UNITED STATES PATENTS

| | | | |
|---|---|---|---|
| 1,396,319 | 11/1921 | Champlin | 222/193 X |
| 2,670,108 | 2/1954 | Skogstap et al. | 222/561 |
| 2,988,250 | 6/1961 | Ryan | 222/561 |
| 683,950 | 10/1901 | Leggett | 222/193 X |
| 1,808,654 | 6/1931 | Hagens | 239/654 X |
| 2,578,482 | 12/1951 | Mindrup | 239/656 X |
| 3,202,320 | 8/1965 | Patton | 222/193 X |
| 3,265,445 | 8/1966 | Cronin | 222/193 UX |

Primary Examiner—M. Henson Wood, Jr.
Assistant Examiner—John J. Love
Attorney—James D. Givnan, Jr.

[57] ABSTRACT

A machine is disclosed for travel along a linear course while simultaneously projecting seed and fertilizer for deposit along an area adjacent said course. A blower provides an airflow which passes through a mixing chamber whereat baffles, spaced in the direction of airflow, produce an area of reduced pressure. The seed and fertilizer are introduced into said chamber between the spaced apart baffles for unobstructed entry into the airflow. A discharge conduit assembly moves vertically during machine operation to spread the discharged material. Operator controlled means works in conjunction with flow regulating means to precisely regulate the flow of seed and fertilizer to the mixing chamber.

1 Claim, 7 Drawing Figures

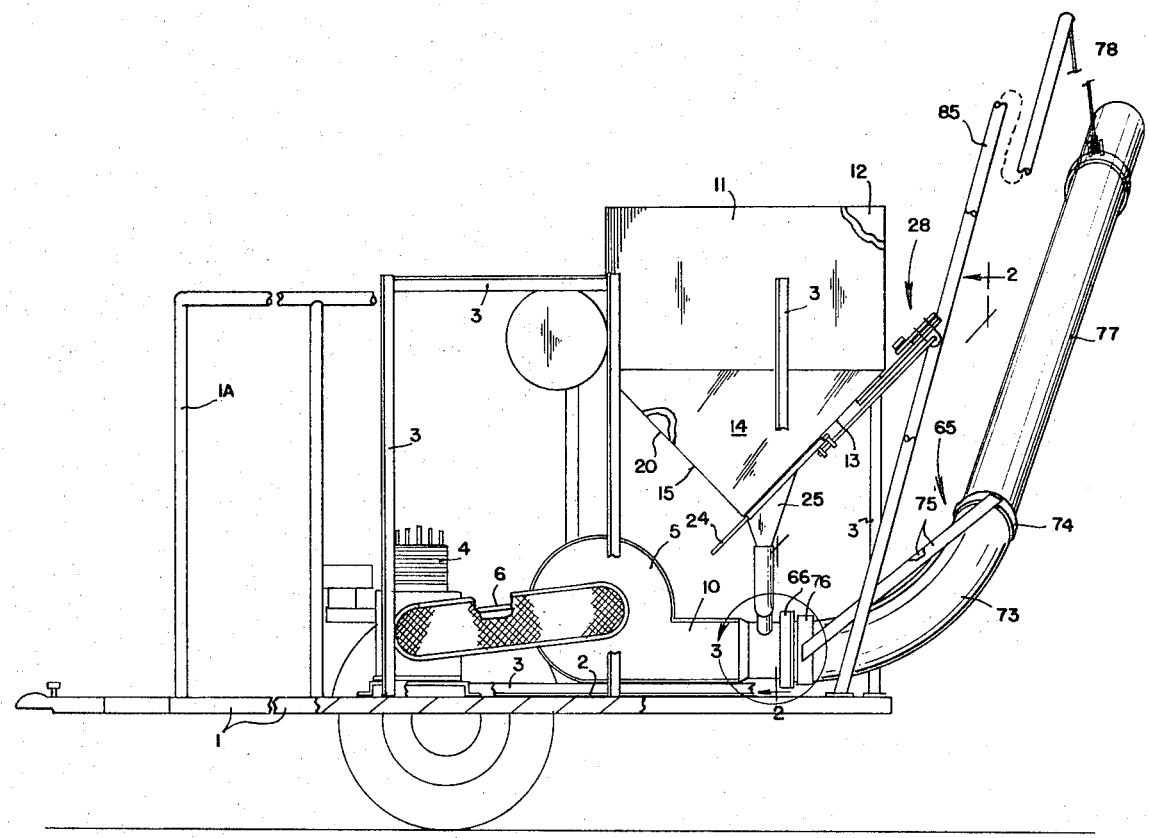
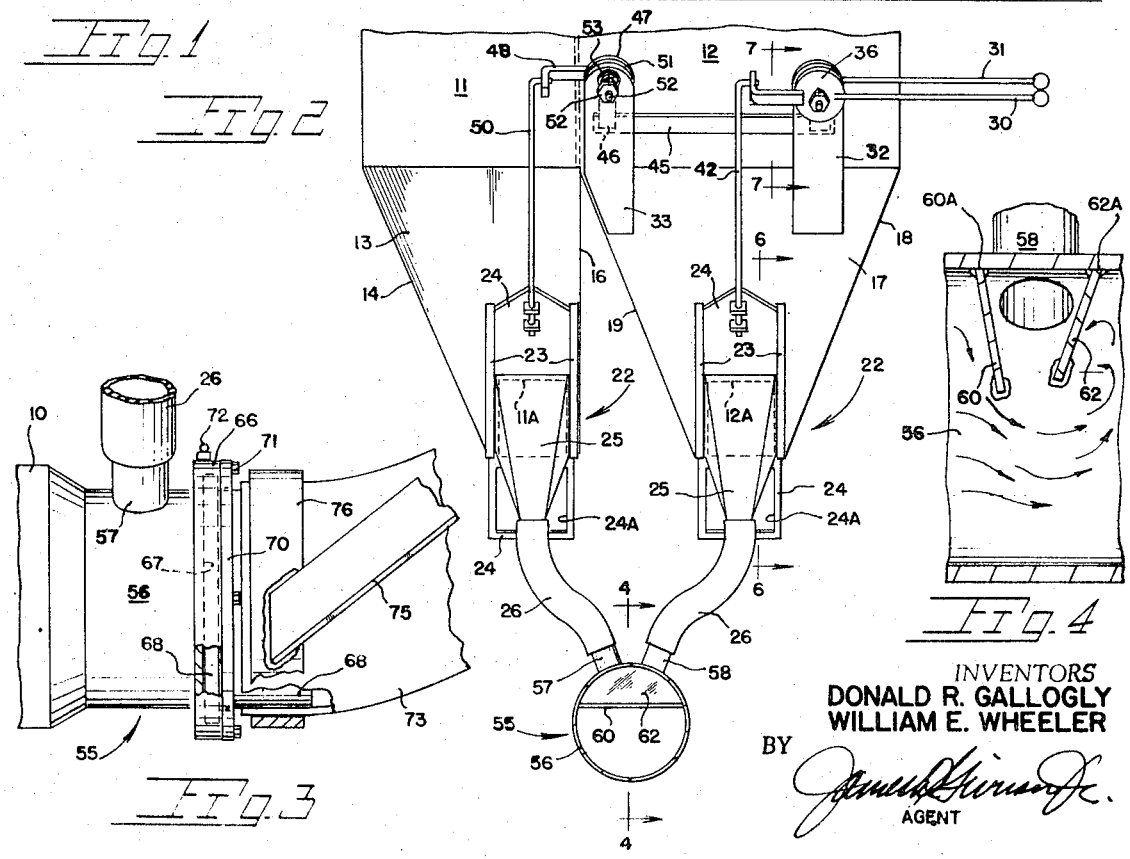
Fig.1
Fig.2
Fig.3
Fig.4
INVENTORS
DONALD R. GALLOGLY
WILLIAM E. WHEELER
BY
AGENT

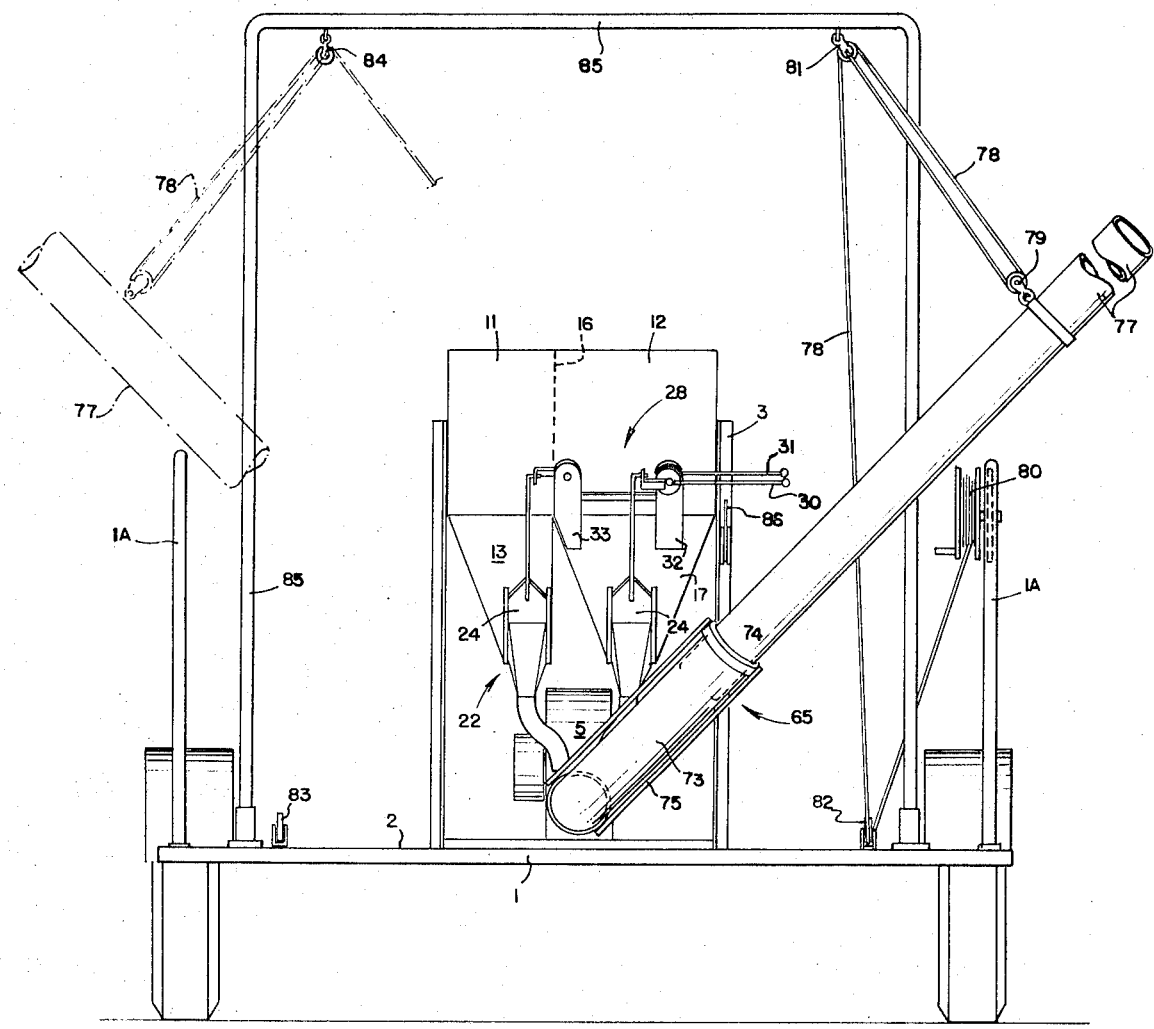
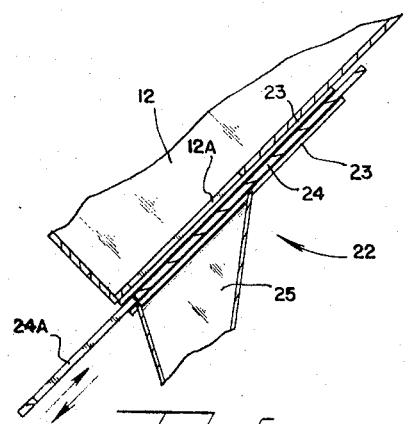
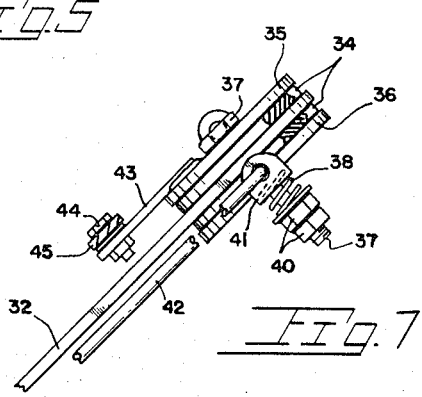

SEED AND FERTILIZER SPREADER

BACKGROUND OF THE INVENTION

The present invention relates generally to a machine for mixing particulate material within a conduit carrying a pressurized flow of air and subsequently discharging the mixed, airborne particles along a trajectory to the desired location remote from the machine. The present machine is disclosed as being for use in the mixing of grass seed and chemical fertilizer for delivery to ground surfaces adjacent a roadway for seeding same.

While the prior art includes machines for the casting of seed on newly formed slopes the same have not proved entirely satisfactory for various reasons. One problem encountered by such machines results from the forceful contact of the seeds against one another and the machine structure resulting in physical damage to the seeds which inhibits or prevents germination. Similarly, the mixing of particulated fertilizer in such a manner results in a portion of the fertilizer particles being reduced to dust which is lost in air currents between discharge from the machine and the ground. Accordingly, it is highly desirable to provide a machine including mixing means for interjecting seed and fertilizer into a pressurized airflow in a non-injurious manner to ensure same remaining intact.

Some prior art machines subject the seeds and/or seeds and fertilizer to the blades of a mechanical blower resulting in the above mentioned damage to same. Other efforts attempted have been to inject seeds and/or seeds and fertilizer downstream from blower means against an undesired reverse airflow which prevents controlled entry of the seed and/or seed and fertilizer. Their entry at best is in a non-precise, random manner not conducive to maintaining a desired rate of seed discharge or keeping a desired ratio of seed to fertilizer.

SUMMARY OF THE INVENTION

The present invention is embodied in a machine for depositing seed and fertilizer on wide strips of ground located along roadways wherein it is necessary to cast the seed and fertilizer over a distance of several feet. Important to the present machine is a mixing chamber receiving grass seed and fertilizer downstream from an airflow source, such as a blower, for injecting the seed and fertilizer material into the pressurized airflow. Included in the mixing structure are baffle means for diverting a portion of the air stream imparting turbulence to same to facilitate entry of the above mentioned material.

The present spreader machine includes hoppers, each having independently regulated flow control mechanisms for the precise regulation of hopper contents to the mixing chamber. The operator may regulate the flow control means to achieve the desired ratio of seed to fertilizer as well as the rate of discharge of each into the mixing chamber. The control means includes settable friction elements to overcome machine vibration.

A movable discharge conduit is swingably mounted on the machine to receive the pressurized airflow and impart a trajectory to the discharged material. Operator controlled means associated with said discharge conduit imparts swinging movement to same whereby the trajectory of the discharged seed and fertilizer material may be varied for purposes of desired ground coverage. The movement of the present machine along a roadway accompanied by continuous swinging movement of the discharge conduit results in a uniform deposit of grass seed and fertilizer along a ground area several feet in width marginal to the roadway. While being shown as mounted on a trailer the present machine may obviously be supported by another type of mobile base.

It is an important object of the present machine to provide means for injecting and mixing seed and fertilizer pellets into an airflow in a closely controlled manner. An area of reduced pressure within the conduit results from baffle means with said low pressure area facilitating the entry of the seed and fertilizer. Such material, being injected into the airflow downstream from the blower means, avoids injurious contact of the material with moving blower components. Damage to the seed shell is avoided and similarly the fertilizer pellets are kept intact insuring their ground deposit rather than their loss to random air currents as occurs when reduced to dust by forceful contact with the machine.

A further important object is the provision of a mobile spreader machine of compact size, transportable by truck or trailer and operable by a single individual. All of the machine controls are conveniently located for operation by a single operator contributing to low operational costs which when coupled with the machines original cost of manufacture results in a spreader attractive to a wide range of users.

A further object of the present invention is achieved by the provision of manually controlled, settable, control means for the fertilizer and grass seed which permit the operator to precisely regulate the discharge from the hoppers. Changing conditions in the terrain of the area to be seeded will require the operator to make adjustments from time to time in the rates of seed and fertilizer flow, the volume of air being discharged and the range of travel of the discharge conduit. Toward these ends the operator's station is provided with convenient controls.

BRIEF DESCRIPTION OF THE DRAWINGS

In the accompanying drawings:

FIG. 1 is a side elevational view of the spreader with fragments broken away and parts sectioned for purposes of illustration, FIG. 2 is a rear elevational view of the spreader taken approximately along irregular line 2 – 2 of FIG. 1, FIG. 3 is an enlarged detail view of the portion of the spreader circled at 3 in FIG. 1, FIG. 4 is a sectional elevational view of a mixing chamber taken along line 4 — 4 of FIG. 2, FIG. 5 is a rear elevational view of the spreader, FIG. 6 is a sectional view of flow regulating structure carried by a bin and taken along line 6 — 6 of FIG. 2, and FIG. 7 is a detail view of a manual control for the regulating of bin flow taken along line 7 — 7 of FIG. 2.

DESCRIPTION OF THE PREFERRED EMBODIMENTS

With continuing reference to the accompanying drawings wherein applied reference numerals indicate parts similarly identified in the following specification, the reference numeral 1 indicates a mobile base for the spreader which is shown as a trailer but may, of course, be in other forms such as the bed of a pick up truck with a requirement being that of forward motion at low speed, 4 to 8 miles per hour. The trailer is provided with a rail 1a for safety of the machine operator.

Secured in place on the bed 2 of the trailer is a welded steel framework 3 which carries substantially all of the following described components in a pre-assembled manner and permitting their removal and installation on any other suitable mobile base if so desired.

Mounted within the framework 3 is a power source in the form of an engine 4 having the conventional engine accessories and driving a centrifugal blower 5 through power transmission means 6 which may be in the form of a double V-belt drive. Blower 5 includes an exhaust duct at 10 terminating in communication a mixing chamber later described in detail. In one embodiment of the invention the engine 4 is rated at 12 horsepower to drive a 14 inch diameter blower fan at 1,650 RPM to provide an entirely adequate airflow through a mixing chamber of 6 inch diameter. If desired a clutch assembly may be interposed between the engine and transmission means, however, starting of the engine either manually or electrically is possible while in driving engagement with the blower.

Additionally mounted within framework 3 are side-by-side hoppers with a seed hopper at 11 and a fertilizer hopper at 12. Seed hopper 11 has downwardly converging walls 13, 14 and 15 while a common upper wall portion 16 is vertical. The rearwardly disposed wall 13 serves to mount flow regulating means for both hoppers as later described. Fertilizer hopper 12 is similar to foregoing hopper with the differences providing an increased capacity by reason of walls 17 through 20 all being inclined walls. The hoppers may be of any capacity however the chemical fertilizer hopper will be of greater size by reason of the greater proportional use of same to seed.

Flow regulating means indicated generally at 22 for the seed and fertilizer hoppers are identical hence the following description of one such means is believed adequate. With attention to FIGS. 2 and 6, the lower portion of hopper 11 is fitted with a pair of channels 23 on opposite sides of a rectangular hopper opening 11A (12A in hopper 12). Slidably carried within the channels and closing (in one position) the opening 11A is an elongate, light gauge steel plate 24 having an opening 24A at its lower end and corresponding in size with opening 11A of the hopper and registerable therewith upon plate positioning. Secured to the outer flanges of the channels is a chute structure 25 for receiving the seed flow from the hopper 11 as regulated by the positioning of plate 24 and the opening 24A therein. The chute structure is carried by said outer flanges and is spaced from the adjacent wall hopper 11 to receive the plate 24 in a close, sliding relationship to prevent any loss of material. The lower end of the chute terminates in a collar which receives a flexible conduit 26.

Operator controlled means is indicated generally at 28 for positioning of the slidable plates 24 associated with each hopper. Said control means includes a pair of closely spaced levers 30 and 31 for single handed operation by the spreader operator. Supporting the control levers are a pair of inclined bases 32, 33 welded adjacent their lower ends to the hoppers 11 and 12. The inclined base 32 carries at its upper end (FIG. 7) a pair of oppositely disposed resilient, friction pads 34 outwardly of which are mounted movable discs 35, 36. Extending through the discs, pads and the base end is a bolt member 37 having a helical spring 38 and nut elements 40 for biasing the foregoing components together and locking same in adjusted relationship while permitting control lever movement. The disc 36 is provided with a laterally extending arm 41 to loosely receive a plate control rod 42 terminating downwardly in attachment with one plate 24. The remaining disc 35 has a depending arm at 43 to which is pivotally linked at 44 to a connector bar 45 which terminates in like pivoted attachment with an arm 46 (FIG. 2) carried by a disc 47 rotatably mounted on the second base 33. The last mentioned disc additionally carries an arm 48 extending outwardly to loosely receive a plate control rod 50 for the remaining plate 24 for regulating seed flow. In similarity to the first described control means a resilient pad 51 is provided along with a bolt member 52, helical spring 53 and nut elements 54 to permit setting of the degree of friction between disc 47 and its support 33. The control levers so mounted are not susceptible to movement from machine vibration and permit convenient lever adjustment by one hand of the operator.

The mixing chamber is indicated generally at 55 and includes an air duct 56 receiving an airflow from the blower exhaust duct 10. A pair of sleeves 57–58 receive the lower ends of the flexible conduits 26 which sleeves are in open communication with the interior of air passageway as typically seen in FIG. 4. When the latter is of a 6 inch diameter it has been found desirable to provide collars of approximately 2 inch inside diameter for both the seed and fertilizer flow.

A first or upstream baffle is indicated at 60, inclined in the direction of the airflow and being of planar shape having a curved upper edge 60A for welded securement to the internal peripheral wall of the duct 56. Rearwardly, or downstream of the sleeve openings is a second or downstream baffle at 62, similar in shape to the first described with a curved upper edge 62A but of opposite inclination i.e., toward the airflow and extends a somewhat lesser distance into the duct 56. With continuing reference to FIG. 4 it will be seen that the airflow, shown by applied arrows, will be downwardly deflected by baffle 60. Accordingly, an area of reduced pressure is formed which includes that area intermediate the lower edges of the baffles 60, 62 with the latter baffle serving to prevent a reverse airflow into the collar openings. The airflow being directed away from the collar defined openings in the passageway permits entry of the seed and fertilizer material in an unopposed manner with the material entering the airflow intermediate the uneven lower chordal edges of the oppositely inclined baffles. One entirely satisfactory form of baffle arrangement in a 6 inch diameter duct locates baffle 60 at approximately a 15° rearward inclination from the verticle while baffle 62 is of approximately 30° forward inclination from the verticle all relative to airflow direction. In a circular air duct of the above noted diameter the baffles 60, 62 extend downwardly approximately one-third of the diameter with the baffle 60 extending downwardly approximately ¼ inch beyond the corresponding lower edge of baffle 62.

A movable discharge conduit assembly is indicated generally at 65, receiving the airbourne seed and fertilizer for discharge along a trajectory for ground deposit. Secured to the rearward end of air duct 56 is a ring 66 annularly shouldered at 67 to receive a flanged collar 68. Sadi conduit end is retained by a circular plate 70, secured by bolts 71 to the internally shouldered ring 66. Accordingly, the flanged collar 68 is rotatably retained within ring 66 with a lubrication fitting at 72 provided for servicing purposes. Extending outwardly in an arc is a conduit segment 73 extending approximately through 80° and terminating in a retention band 74. A pair of braces 75 are in welded attachment between the first mentioned band 74 and a companion band 76 disposed about the forward end of conduit 73. Said bands are provided with outwardly turned pairs of ears to receive a bolt member (not shown) for clamping of said bands and hence securing the curved conduit 73 about the collar 68 at one end and oppositely about one end of a straight conduit segment 77 carried within its opposite end.

The conduit segment 77 is swingable within an upright plane by means of a control line 78 in pulley attachment at 79 with said conduit with the line 78 terminating in wound engagement with a manually operated drum 80. Drum rotation causes movement of line 78 inwardly and outwardly past pulleys 81–82 resulting in swinging movement being imparted to the entire conduit assembly 65. Accordingly as the mobile base advances and with the operator actuating drum 80 first in one direction and then in the other the seed and fertilizer material will be projected to the side of the mobile base along a continuously changing trajectory to evenly spread the material upon the strip of ground being seeded.

A second set of pulleys are provided at 83–84 for reeving of line 78 which permits the discharge conduit assembly 68 to project towards the opposite side of the base 1 as seen in FIG. 5 in broken lines. A tubular framework 85 provides a support for the pulleys 81, 84. For travel to and from a worksite the straight conduit 77 may be removed from the curved conduit 73 and secured in place along the railing of the mobile base.

The operation of the spreader is believed evident from the foregoing description. The operator controls movement of the conduit assembly 65 by manual rotation of drum 80 while a throttle at 86 permits engine speed control. In most instances lever 30–31, controlling the rate of flow of seed and fertilizer into the mixing chamber 55, will not require adjustment during a seeding operation. The forward speed of approximately 5 to 7 miles per hour permits the operator to rotate drum 80 at a convenient speed for the range of travel desired, usually with an upper limit of travel being about 75° while at its lowermost limit approaching the horizontal. The operator can visually ascertain whether or not uniform ground coverage is being achieved.

While a single embodiment of the invention has been shown it will be apparent to those skilled in the art that the invention may be embodied still otherwise without departing from the spirit and scope of the invention.

Having thus described the invention what is desired to be secured under a Letters Patent is:

1. A spreader machine for depositing particulate material such as seed and chemical fertilizer along a ground strip adjacent the course of the machine, said machine comprising, a mobile base, a pair of juxtaposed hoppers for the storage of the particulate material, flow regulating means carried by said hopper means and regulating material discharge therefrom, said flow regulating means including elongate apertured plates, channels spaced in parallel and carried by lower wall portions of said hoppers and slidably mounting said plates for rectilinear movement along said wall portions for adjustable registration of the plate apertures with openings in the hopper wall portions to regulate the discharge from said hoppers, chutes each having a rectangular upper periphery secured to said channels along two of its sides and each receiving the discharge flow from a hopper with the remaining two sides of the chutes being in sliding contact with a plate to prevent loss of particulate material, operator controlled means coupled to said flow regulating means and settable by the machine operator to adjust said flow regulating means, said operator controlled means including, independent control levers for adjustment of each of the plates of each flow regulating means, a pair of discs each supporting one end of a control lever, a base support for said discs, resilient pads interposed between said base support and each of said discs, adjustable means extending through said support, pads and discs for biasing same into frictional engagement to prevent control lever vibratory movement, a blower, and an air duct defining a mixing chamber and receiving an airflow from said blower, said air duct defining at least one opening for the entry of the regulated flow of particulate material into said duct.

* * * * *